Aug. 14, 1928.
S. B. HASELTINE
1,680,292
FRICTION SHOCK ABSORBING MECHANISM
Original Filed Sept. 26, 1923  2 Sheets-Sheet 2
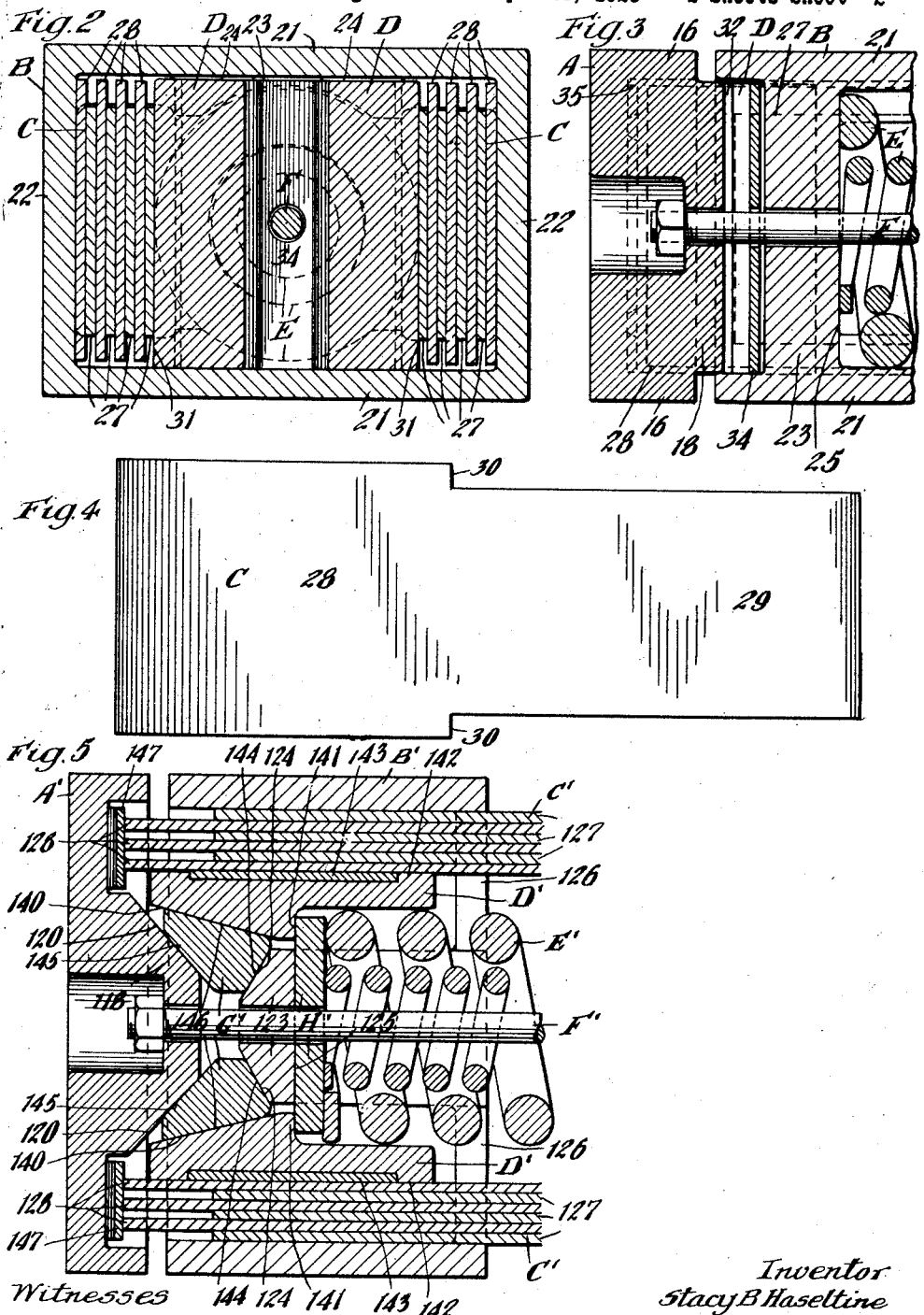

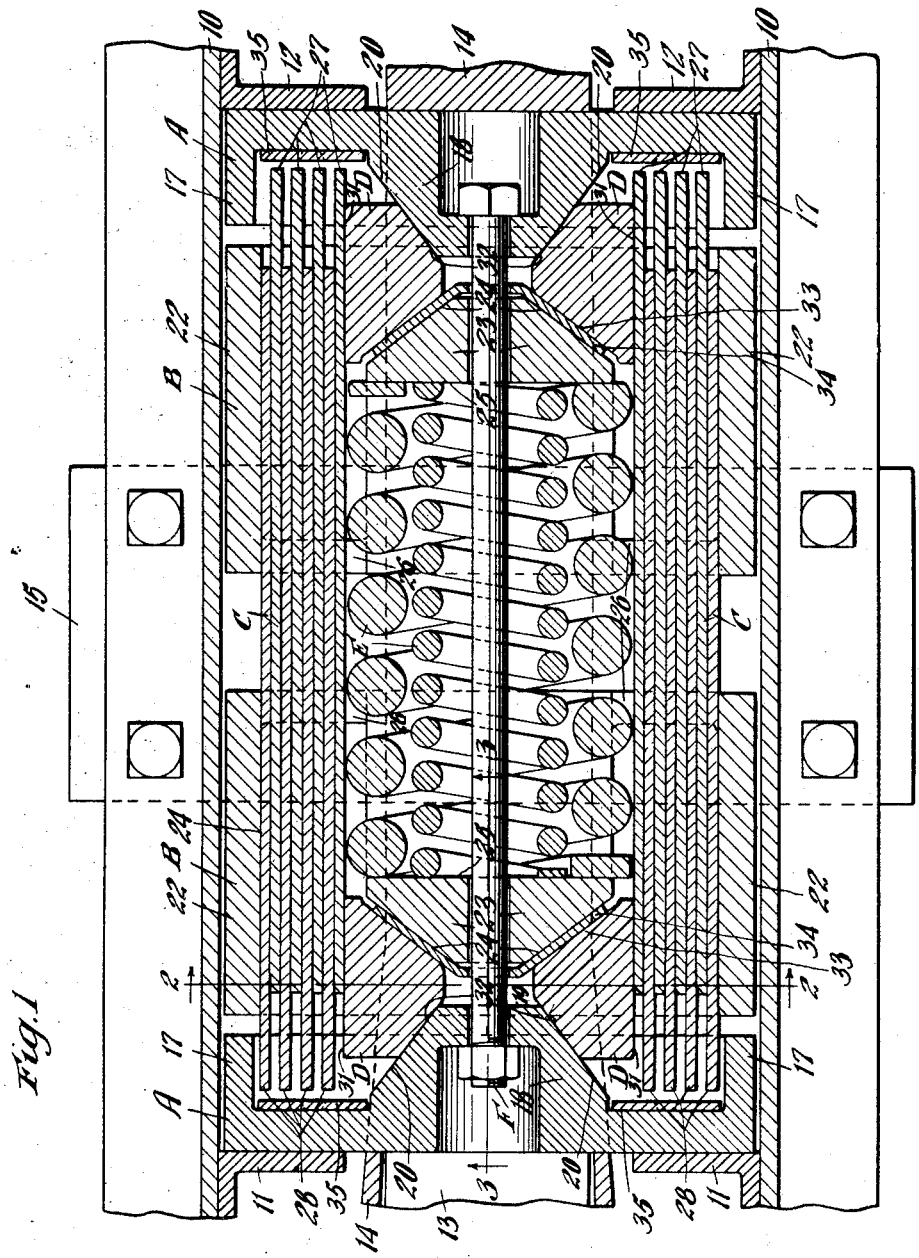

Patented Aug. 14, 1928.

1,680,292

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed September 26, 1923, Serial No. 664,868. Renewed February 16, 1928.

This invention relates to improvements in friction shock absorbing mechanism.

One object of the invention is to provide a friction shock absorbing mechanism, more particularly adapted for railway draft riggings, wherein is obtained high capacity due to large friction areas, together with quick and certain release.

Another object of the invention is to provide a friction shock absorbing mechanism of the intercalated plate type wherein a graduated action in both compression and release is obtained by producing a preliminary action of the followers and the wedges prior to engagement and movement of the friction plates by the followers, and then effecting a relative movement of the friction plates after the full wedging action has been set up.

Other objects and advantages of the invention will more clearly appear from the description and claims hereinafter following.

Fig. 1 is a horizontal, longitudinal, sectional view of a portion of a railway draft rigging, showing my improved shock absorbing mechanism in connection therewith. Fig. 2 is a vertical, transverse sectional view corresponding substantially to the line 2—2 of Fig. 1. Fig. 3 is a vertical, longitudinal, sectional view corresponding substantially to line 3—3 of Fig. 1. Fig. 4 is a detailed, side elevational view of one of the friction plates. And Fig. 5 is a horizontal, longitudinal, sectional view of the front end of a shock absorbing mechanism illustrating a different embodiment of the invention.

In said drawings, referring first to Figs. 1, 2, 3 and 4, 10—10 indicate channel draft sills of a railroad car, to the inner faces of which are secured front stop lugs 11 and rear stop lugs 12. A portion of the drawbar is shown at 13, to which is attached a hooded yoke 14. The shock absorbing mechanism proper, including the front and rear followers, is disposed within the yoke 14, and the movable parts of the draft rigging are supported by a detachable saddle plate 15.

The improved shock absorbing mechanism proper, as shown in Figs. 1 to 4 inclusive, comprises, broadly, front and rear wedge followers A—A; front and rear combined shell and spring follower members B—B; two groups of friction plates C—C; front and rear pairs of friction shoes D—D; a spring resistance E; and a retainer bolt F.

The front and rear wedge followers A are of like construction, and co-act respectively with the front and rear stop lugs in the usual manner. Each follower A is of rectangular outline and is provided with spaced, horizontal, inwardly projecting top and bottom flanges 16—16, vertically arranged, spaced, inwardly projecting side flanges 17—17 and an inwardly projecting, hollow wedge portion 18 disposed centrally between the side flanges and extending from the top flange to the bottom flange. The projecting wedge portion 18 protrudes beyond the inner edges of the flanges 16 and is provided with a flat front end face 19 and vertically disposed inwardly converging side faces 20.

The front and rear combined friction shell and spring follower members B are of like construction, each being of substantially box-like shape and comprising horizontally extending, top and bottom walls 21—21, vertically extending, spaced, side walls 22—22 and a relatively heavy post 23 extending from the top to the bottom wall thereof and formed integral therewith. The post 23 of each shell is spaced inwardly a slight distance from the outer end of the shell and equally from each of the side walls 22, and is provided with outwardly converging flat wedge faces 24. Each of the posts 23 is also provided with a transversely extending flat inner face adapted to form an abutment for the adjacent ends of the inner and outer coils of the spring resistance E, the spring resistance E being interposed between the inner faces 25 of the posts of the front and rear shells B. At the inner end of each shell B, the top and bottom walls 21 are provided, respectively, with downwardly and upwardly projecting transverse ribs 26 extending inwardly a short distance from the side walls.

The friction plates C are arranged within the shells B and comprise two oppositely disposed groups. As herein shown, the groups of plates C each comprises four plates 27 and four plates 28, the plates 27 and 28 being alternated, with a plate 28 of each group arranged outermost and in contact with the inner surfaces of the adjacent side walls 22 of the shell B. The plates 27 and 28 are of similar construction and, as best shown in Fig. 4, each plate is cut away at the upper and lower sides for a considerable portion of its length, to thereby provide a relatively narrow portion 29 and alined upper and lower vertically disposed stop shoulders 30. As shown in Fig. 1, the plates 27 and 28 are alternated and reversely arranged with the shoulders 30 of the friction plates 27 co-acting with the ribs 26 of the rear shell B and the shoulders 30 of the plates 28 co-acting with the ribs of the front shell B and the reduced portions 29 of the plates 27 and 28 extending between the ribs of both shells. The plates are so proportioned and arranged that the front ends of the plates 28 are disposed nearer the front follower A than the corresponding ends of the plates 27, and the rear ends of the plates 27 are disposed nearer the rear follower A than the rear ends of the plates 28.

The wedge friction shoes D are all of like construction, being in the form of blocks arranged in pairs at the front and rear ends of the mechanism. Each of the shoes D has a flat side face 31 adapted to engage the adjacent friction plate 27, an outer wedge face 32 adapted to co-act with one of the follower wedge faces 20 and a relatively blunter wedge face 33 adapted to co-act with one of the wedge faces 24 of the post 23 of one of the shells A. A hardened wear plate 34 is preferably interposed between the wedge faces 24 of each post 23 and the faces 33 of the adjacent pair of shoes, the plate 34 being angularly shaped to conform to the outer portion of the post. Wear plates 35, adapted to form abutments for the ends of the friction plates, may also be provided, the same being shown as secured to the inner faces of the front and rear followers at opposite sides of the central projections 18.

The shock absorbing mechanism is held under initial compression by the retainer bolt F passing through the inner coil of the spring resistance element E and alined openings in the post 23, wear plates 34 and wedge projections 18, having one end thereof anchored to the rear follower by means of the head received in the hollow projection 18 thereof and having the other end anchored to the front follower by means of the nut received in the hollow projection 18 thereof. Compensation for wear of the various friction and wedge surfaces is taken care of by the expansive action of the spring resistance element forcing the combined spring follower and shell members and the friction shoes forwardly and rearwardly, proper clearance being left between the outer ends of the shells and the inner ends of the flanges of the followers to permit of the necessary movement.

When the parts are in normal position, as shown in Fig. 1, the combined spring follower and friction shell members are held in the extreme outer position by the expansive force of the spring resistance element E, with the ribs 26 of the front and rear shells engaging, respectively, the shoulders 30 of the plates 27 and 28 thereby maintaining the rear ends of the plates 27 slightly spaced from the inner wall of the rear follower and the front ends of the plates 28 slightly spaced from the inner face of the front wall of the front follower. As will be evident, the separating movement of the shells B is limited due to the contact of the wedge faces of the shoes with the wedge faces of the shells and followers, the shoes being prevented from spreading apart by abutting the opposite groups of friction plates C.

In the operation of my improved shock absorbing mechanism, assuming that the front follower A is being moved rearwardly toward the rear follower during buff, a wedging action will be set up between the wedges of the front and rear followers and the shoes D, thereby forcing the groups of plates firmly against the side walls of the shells and placing the same under lateral pressure, augmenting the frictional resistance between the plates. During the further rearward movement of the front follower A, the front shell will be forced rearwardly toward the rear shell, due to the bodily rearward movement of the front wedge shoes therewith; the rear shell being held substantially stationary by the rear shoes D and the rear wedge follower. Due to the friction between the groups of plates and the shells and shoes, there will be a tendency for the plates to move rearwardly with the front shell and an equal tendency for the plates to be held stationary with the rear shell. On account of this balancing action the rear ends of the plates will approach the rear follower at substantially the same rate as the front follower approaches the front ends of the plates. This action continues until the front and rear followers engage, respectively, with the front ends of the plates 28 and the rear ends of the plates 27 whereupon the plates will be moved relatively by the followers, until the opposite ends of the respective plates engage with the front and rear followers, whereupon the plates will act in the manner of a stop column transmitting the pressure directly from the front follower to the rear follower. It will be evident that the resistance to relative movement of the followers is greatly increased after the same engage the plates and move them relatively to each other, and that a preliminary action of the mechanism to take care of light shocks is thus had before the plates come into full play. In addition to the friction created between the relatively movable plates during rearward movement of the front follower A, friction will also be created between the outermost plates of each group and the inner surfaces of the side walls of the rear shell B. As the followers approach each other and the plates move relatively, the ribs 26 and shoulders 30 will be separated an appreciable distance thus assuring a certain release of the mechanism, as the plates are not picked up by the same until after the wedging pressure has been reduced sufficiently to assure easy release. During draft, the action will be the reverse of that just described, the rear follower being moved toward the front follower which is held stationary.

When the actuating pressure is relieved, the wedge pressure is instantly reduced due to the wedge followers dropping away from the wedge friction shoes and the relative bluntness of wedge faces 24 and 33, permitting the spring to expand and force the spring follower shells and shoes apart. After the wedging pressure on the plates has been thus released, as the shells continue to separate, the plates are picked up by engagement of the ribs 26 with the shoulders 30, and all of the parts are restored to the normal position shown in Fig. 1.

Referring next to the construction illustrated in Fig. 5, the front portion only of the shock absorbing mechanism is shown, it being understood that the mechanism shown in this figure is duplicated at the rear end. The improved shock absorbing mechanism, as shown, comprises, broadly, front and rear followers A'—A'; front and rear combined friction shell and spring follower members B'—B'; two groups of friction plates C'—C'; front and rear pairs of friction shoes D'—D'; a spring resistance E'; a retainer bolt F'; front and rear pairs of auxiliary wedge blocks G'—G'; and spring follower plates H'.

The front and rear wedge followers A' are of substantially the same construction as the wedge followers A shown in Figs. 1, 2 and 3, being provided with top and side flanges and a central wedge projection 118 having inwardly converging wedge faces 120.

The front and rear combined friction shell and spring follower members B' are of a construction substantially identical with the shells B and are provided with ribs 126 at their inner ends adapted to co-act with the shoulders of the friction plates 127 and 128 of the groups C' arranged on opposite sides of the mechanism. The plates 127 and 128 are also identical with the plates 27 and 28 of the construction illustrated in Figures 1, 2 and 3, but in this instance each group of plates C' consists of three plates 127 and three plates 128. Each of the shells B' is also provided with a post 123 having a flat inner face 125 and converging outer faces 124 extending at relative blunt angles with reference to the axis of the mechanism.

The friction wedge shoes D' differ somewhat from the shoes D in that the same do not cooperate directly with the post 123 and each has only a single wedge face 140 disposed at a relatively keen angle with reference to the longitudinal axis of the mechanism and coacting with the corresponding auxiliary wedge block G'. Each of the wedge friction shoes D' is also provided with a vertical shoulder 141 at the inner end of the wedge face 140 adapted to form an abutment for the adjacent spring follower plate H'. The flat outer face 142 of each of the friction shoes D' in this instance, is provided with a hardened steel spring plate 143 adapted to coact with the inner-most friction plate of one of the groups C'.

Although the plates 143, in Figure 5 of the drawing, are shown as flattened out, they exert a certain amount of pressure laterally on the plates C', as they are curved longitudinally before being assembled with the other parts of the mechanism. The convexed surface of each plate 143 is preferably disposed outwardly when the gear is assembled. The spring plates 143 due to the lateral pressure exerted thereby, aid in the releasing action of the mechanism when the compressing forces are removed from the gear.

The front and rear wedge blocks G' are of like construction and are arranged in pairs at opposite ends of the mechanism, each of said blocks being provided at its inner end with a relatively blunt wedge face 144 adapted to coact with one of the wedge faces 124 of the corresponding post 123, a relatively blunt wedge face 145 at its outer end adapted to coact with one of the wedge faces 120 of the corresponding wedge followers A', and a relatively keen wedge face 146 at the outer side thereof adapted to coact with the keen wedge face 140 of the corresponding wedge friction shoe D'. Spring plates 147 are preferably interposed between the inner face of the front and rear followers A' and the adjacent ends of the plates 128 and 127 respectively, the spring plates being arranged at opposite sides of the wedge projection 118 of each follower and adapted to have substantially constant engagement with the adjacent ends of the plates of the corresponding group C'.

In the operation of the improved shock absorbing mechanism, illustrated in Figure 5, assuming that the front follower A' is being moved rearwardly toward the rear follower, a wedging action will be set up between the keen wedge faces of the shoes D' and the auxiliary wedge blocks G', there being no substantial movement between the wedge faces of the front and rear followers A' and the wedge faces of the wedge blocks G' and between the wedge faces of the posts 123 of the shell B' and the wedge faces at the inner ends of the wedge blocks G'. Due to this wedging action the groups of plates will be subjected to lateral pressure in a manner similar to that described in connection with the operation of the device shown in Figures 1, 2, 3 and 4. During the relative approach of the front and rear followers A', the shells B' will be forced toward each other and as the front and rear followers approach the ends of the friction plates, the springs 147 will be compressed and flattened out, the motion of the front and rear followers being gradually communicated to the plates and the plates moved relatively in a manner similar to that described in connection with Figures 1 to 4 inclusive. The relative movement of the front and rear followers, front and rear shells and plates 127 and 128 continues until the front ends of the plates 127 and the rear ends of the plates 128 through the plates 147 engage the front and rear followers respectively, whereupon the same will act as a stop column transmitting the pressure directly from the front follower to the rear follower. It will also be evident that the ribs 126 on the respective shells B' will be spaced from the shoulders on the plates 127 and 128 in a manner similar to that described in connection with Figures 1 to 4 inclusive.

Upon removal of the actuating force, the front and rear followers will drop away from the wedge blocks G' and the wedging pressure will be instantly relieved due to the bluntness of the angles of the faces 124 and 144 of the post 123 and the blocks G' and to the tendency of the plates 143 to resume their bowed condition, whereupon the expansive action of the spring resistance E' will cause the entire wedging system including the wedge-friction-shoes and casings B' to separate, the ribs 126 on the shells B' finally picking up the friction plates and all the parts will be restored to normal position. The spring plates 147 serve as an auxiliary means for assisting in release of the mechanism by forcing the front and rear follower A' outwardly when the actuating force has been removed.

I have herein shown and described what I now consider the preferred manner of carrying out this invention, but the same is merely illustrative and I contemplate all changes and modifications that come within the scope of the claims appended hereto.

I claim:

1. In a friction shock absorbing mechanism, the combination with front and rear main followers movable toward and away from each other; of front and rear spring follower shells; a spring resistance co-acting with said shells; a longitudinally arranged wedge pressure creating means co-acting with said followers and shells; and longitudinally arranged friction plates adapted to be moved relatively during relative movement of said main followers, said plates being divided into two groups on opposite sides of said wedge pressure creating means.

2. In a friction shock absorbing mechanism, the combination with front and rear main followers; of oppositely arranged front and rear shells; a spring resistance; a longitudinally arranged wedge pressure creating means co-acting with said followers, said means including spring follower members movable respectively with said shells; and a plurality of relatively movable sets of friction plates within said shells, said plates being divided into two groups on opposite sides of said wedge pressure creating means.

3. In a friction shock absorbing mechanism, the combination with front and rear main followers movable toward and away from each other; of oppositely arranged front and rear, relatively movable shells; a spring resistance; a longitudinally arranged wedge pressure creating system co-acting with said main followers, said system including spring followers formed integral with said shells; and longitudinally arranged co-acting friction plates adapted to be moved relatively during relative movement of said followers, said plates being disposed within said shells and divided into two groups on opposite sides of said wedge pressure creating system.

4. In a friction shock absorbing mechanism, the combination with front and rear main followers movable toward and away from each other; of oppositely arranged, front and rear, relatively movable shells having wedge means thereon; a spring resisting relative approach of said shells; wedges movable with said front and rear followers; a plurality of wedge shoes co-acting with said wedge means and wedges; and longitudinally arranged, co-acting friction plates co-operating with said shoes and adapted to be moved relatively during relative movement of said followers, said plates being divided into two groups disposed within said shells and on opposite sides thereof.

5. In a friction shock absorbing mechanism, the combination with front and rear followers having wedge means movable therewith; of oppositely arranged, front and rear shells each having wedge means movable therewith; a plurality of friction wedge shoes co-acting with said wedge means and movable by said followers; means yieldingly opposing relative movement of the shoes associated with the front and rear wedge means; and a plurality of friction plates within said shells, said plates being divided into two groups on opposite sides of said shoes, each of said groups comprising relatively movable sets of plates, one set of each group having means thereon co-acting with one of said shells to effect return of the plates to normal position and the other set having means co-acting with the remaining shell to effect return of the remaining plates to normal position.

6. In a friction shock absorbing mechanism, the combination with front and rear followers having wedge means movable therewith; of oppositely arranged, relatively movable, front and rear shells; a plurality of longitudinally arranged friction plates adapted to be moved by each shell in one direction, the plates movable with the front shell being interposed between the plates movable with the rear shell, and said plates being arranged in groups at opposite sides of said shells; friction shoes interposed between said groups of plates and said wedge means; a spring resistance; and spring follower means formed integral with each shell and having wedge faces adapted to co-act with said shoes.

7. In a friction shock absorbing mechanism, the combination with oppositely arranged front and rear followers; of a pair of friction shells provided with interior friction sufaces, said shells being normally spaced apart and adapted to move relatively; a plurality of wedge blocks movable with said followers; wedge shoes co-operating with said blocks; wedge elements co-operable with said wedge shoes, said wedge elements being movable in unison with said shells; spring means resisting relative movement of said blocks; longitudinally arranged friction plates adapted to be moved relatively by said followers, said plates being divided into two groups on opposite sides of said wedge pressure creating means, each group comprising two sets of plates; and means arranged to engage each plate for restoring each set of plates to normal position with one end of the plates comprising each set slightly spaced from the outer end wall of the adjacent follower.

8. In a friction shock absorbing mechanism, the combination with oppositely arranged, relatively movable, front and rear followers; of longitudinally arranged, relatively movable, intercalated friction plates, said plates being arranged in groups at opposite sides of the mechanism and alternate plates being adapted to be engaged and moved by the front and rear followers respectively; longitudinally arranged lateral wedge pressure creating means at opposite ends of said mechanism adapted to co-act with said followers and be moved thereby; front and rear shells housing said plates, said shells being normally spaced apart and adapted to be moved relatively by said wedge pressure creating means; means for yieldingly resisting relative approach of said shells and restoring the same to normal position; and interengaging means on said shells and plates for restoring the latter to normal position.

9. In a friction shock absorbing mechanism, the combination with front and rear main followers; of oppositely arranged, front and rear, relatively movable shells having wedge means thereon; a spring resistance interposed between said shells; wedges movable with said front and rear followers; a plurality of wedge shoes co-acting with said wedge means and wedges; wear plates interposed between said shoes and wedge means; longitudinally arranged, co-acting friction plates co-operating with said shoes and adapted to be moved relatively upon relative movement of said followers, said plates being divided into two groups disposed within said shells and on opposite sides thereof; and wear plates interposed between the ends of said plates and said followers.

10. In a friction shock absorbing mechanism, the combination with front and rear main followers; of a spring resistance; longitudinally arranged wedge pressure creating means co-acting with said main followers, including front and rear combined wedges and spring followers; longitudinally arranged friction plates adapted to be moved relatively on relative movement of said main followers and means on said combined wedges and spring followers adapted to engage said plates to restore the same to normal position.

11. In a friction shock absorbing mechanism, the combination with front and rear main followers movable toward and away from each other; of oppositely arranged front and rear relatively movable shells having wedge means thereon; spring means, resisting relative approach of said shells; wedges movable with the front and rear followers; of a plurality of wedge shoes co-acting with said wedge means and wedges; and longitudinally arranged intercalated friction plates co-acting with said shoes and adapted to be moved relatively during relative movement of said followers.

12. In a friction shock absorbing mechanism, the combination with front and rear followers relatively movable toward and away from each other; of front and rear friction casings also relatively movable toward and away from each other, each casing and the corresponding follower being arranged for relative movement during the initial action of the mechanism; two laterally separated groups of friction plates co-operating with said friction casings, each group comprising two sets of plates, one of said sets being movable with each follower; spreading means disposed between said groups of plates and directly actuated by each follower, said spreading means engaging said front and rear friction casings to effect movement thereof with the front and rear followers, respectively, during a compression stroke of the mechanism; and spring resistance means opposing relative movement of said spreading means.

13. In a friction shock absorbing mechanism, the combination with front and rear relatively movable follower acting means; of friction casings at the opposite ends of the mechanism; a plurality of intercalated friction plates co-operating with said friction casings, said plates being adapted for relatively movement through said follower acting means; lateral wedge pressure creating means associated with each follower acting means for placing the plates under lateral pressure, said wedge pressure creating means co-operating directly with said follower acting means and being effective to move the corresponding friction casing after a predetermined compression of the mechanism.

In witness that I claim the foregoing I have hereunto subscribed my name this 21st day of September 1923.

STACY B. HASELTINE.